United States Patent
Migliori

(10) Patent No.: US 6,812,428 B2
(45) Date of Patent: Nov. 2, 2004

(54) CLAMPING DEVICE FOR LASER WELDING

(76) Inventor: Luciano Migliori, Piazza A. Claudio, 8, Milan (IT), 20124

( * ) Notice: Subject to any disclaimer, the term of this patent is extended or adjusted under 35 U.S.C. 154(b) by 80 days.

(21) Appl. No.: 10/370,689

(22) Filed: Feb. 24, 2003

(65) Prior Publication Data

US 2003/0183607 A1 Oct. 2, 2003

(30) Foreign Application Priority Data

Apr. 2, 2002 (IT) .................................. MI2002A0683

(51) Int. Cl.[7] .......................... B23K 26/02; B23K 26/20
(52) U.S. Cl. ................................................ 219/121.63
(58) Field of Search ........................ 219/121.6, 121.63, 219/121.64, 121.82; 269/37, 40, 43; 228/212, 213

(56) References Cited

U.S. PATENT DOCUMENTS

| | | | |
|---|---|---|---|
| 4,422,628 A | * 12/1983 | Kasai ........................... | 269/71 |
| 6,076,816 A | 6/2000 | Tunkers | |
| 6,206,353 B1 | 3/2001 | Becker et al. | |
| 6,525,294 B1 | * 2/2003 | Kipping et al. ........ | 219/121.63 |
| 2001/0000211 A1 | 4/2001 | Crorey | |

FOREIGN PATENT DOCUMENTS

| | | |
|---|---|---|
| EP | 0 268 176 | 5/1988 |
| EP | 0 596 808 | 5/1994 |
| EP | 1 236 535 | 9/2002 |
| EP | 1 238 748 | 9/2002 |
| WO | WO 01/12378 | 2/2001 |

* cited by examiner

Primary Examiner—Samuel M. Heinrich
(74) Attorney, Agent, or Firm—Young & Thompson

(57) ABSTRACT

A device for clamping overlapped edges of metal sheets to be joined by laser welding; the clamping device comprises a box-shaped head, a clamping arm pivotally connected to one end of the head, in order to rotate between an open condition, a closed condition in which the overlapped edges of the metal sheets are pressed against each other, and an intermediate condition in which the overlapped edges of the metal sheets are made to be slightly spaced apart for laser welding; the clamping arm is operatively connected to an electric control actuator by a toggle mechanism and intermediate transmission members; the clamping device also comprises counteracting biasing means to rearwardly urging the clamping arm for compensation of clearances existing in the operative connection between the clamping arm and the electric control actuator.

12 Claims, 3 Drawing Sheets

CLAMPING DEVICE FOR LASER WELDING

BACKGROUND OF THE INVENTION

This invention concerns a clamping device for clamping overlapped edges of metal sheets to be connected by laser welding.

STATE OF THE ART

Laser welding of metal sheets is very often used as an alternative to conventional electric welding, for example in the motor vehicle or automotive manufacturing, due to the advantages that laser welding offers in terms of greater speed and reliability, and the lower electrical power required.

The possibilities of using laser welding, however, are limited whenever metal sheets which have been subjected to anticorrosive surface treatment, for example, galvanization, are to be welded, in that, during the welding gases may be generated which give rise to the erosion and perforation of the metal in correspondence with the connection points between the overlapped edges of the metal sheets.

Consequently, in correspondence of the individual welding points there remains an evident trace of the connection between the metal sheets, which does not enable laser welding to be used for joining parts in full view, for example the bodywork of motor vehicles or cars, in that it would jeopardise their aesthetical appearance.

During various tests in the use of laser welding, it was noted that the aforementioned erosion problem of the metal sheets in correspondence of the connection points can be solved by facilitating the dispersion of the gases which are generated during the welding in correspondence with the edges of the metal sheets.

A solution capable of facilitating the dispersion of the harmful gases consists in keeping the overlapped edges of the metal sheets slightly spaced apart from each other, so as to still obtain a laser welding with excellent characteristics in terms of strength and surface finishing, and at the same time obtaining an efficient dispersion of the gases; in particular it was found that an optimum distance $\delta$ of the overlapped edges of the metal sheets, in correspondence with the welding points, can range from 5 to 20 hundredths of a millimeter.

The order of magnitude of such values entails the use of a pressure member, or presser, which enables a reciprocal positioning of the overlapped edges of the metal sheets to be set in a very precise and repeatable way.

The pressure devices provided, for example, by the conventional clamping devices currently available, are not capable of guaranteeing such precision and repeatability of the reciprocal positioning of the overlapped edges of the metal sheets, in that the presence of internal clearances in the pressure devices which are added to one another does not allow a sufficiently efficient control of the presser, as to ensure the high degree of precision required for positioning the metal sheets.

Moreover, the progressive wear of the mechanical members of the clamping device tends to increase the clearances inside the device itself, making the positioning of the metal sheets even more precarious as the wear gradually increases.

A possible solution could be the use of an electronic control system for controlling the clamping device, or for operating the presser, of such kind as to automatically compensate the various clearances to enable the correct positioning of the edges of the metal sheets. A solution of this kind, however, would prove to be too complex and difficult to perform, as well as expensive.

OBJECTS OF THE INVENTION

An object of this invention is to provide a clamping device for clamping the overlapped edges of metal sheets to be laser welded, which allows a low-cost, reliable, and simple mechanical solution, capable of automatically compensating the clearances of the device, in a precise and repeatable way.

BRIEF DESCRIPTION OF THE INVENTION

The above can be achieved by means of a device for clamping overlapped edges of metal sheets to be connected by laser welding, comprising:

a box-shaped head having a longitudinal axis;

a clamping arm pivotally connected to the head to rotate between an open condition, a closed condition in which the overlapped edges of the metal sheets are pressed against each other, and an intermediate welding condition in which the overlapped edges of the metal sheets are slightly spaced apart to allow the laser welding;

an electric control actuator; and a toggle lever mechanism operatively connected between the clamping arm and the electric control actuator, said toggle lever mechanism being connected to the electric control actuator by intermediate transmission members, characterised by comprising counteracting biasing means for compensating clearances in the operative connection between the clamping arm and the electric control actuator; and in that said counteracting biasing means are constructed and disposed to rearwardly urge the clamping lever in the closed condition of the clamping mechanism.

BRIEF DESCRIPTION OF THE DRAWINGS

These and further features according to this invention, will be more clearly evident from the following description with reference to the accompanying drawings, in which.

DETAILED DESCRIPTION OF THE INVENTION

The general features of this invention will be more illustrated hereunder by means of several embodiments.

For the solution to the previously mentioned problem of facilitating the dispersion of the harmful gases from the welding areas, the figures from 4 to 7, show by way of example, a possible shaping of the metal sheet edges to be welded, together with a illustration of the main steps of a laser welding process.

Figure 4:
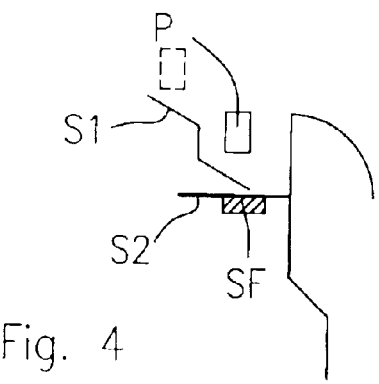
FIGS. 4, 5, 6 and 7 schematically show, in succession, the main steps of a laser welding process for laser welding metal sheets.

In particular, in a first step F1, represented in FIG. 4, a presser P is shown in a raised condition to allow a first metal sheet S1 to be placed in a welding position in respect to a second metal sheet S2; the overlapped edges of the metal sheets S1, S2 are positioned in such a way as to be slanted and spaced apart from each other.

Figure 5:
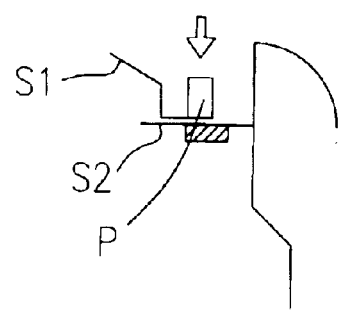

In a second step F2, represented in FIG. 5, the presser P exerts pressure on the overlapped edges of the metal sheets S1, S2, elastically deforming one or both edges of the metal sheets until they come into contact, so as to identify a reference position in relation to which it is possible define a δ value of the distance between the edges of the metal sheets S1, S2, suitable for obtaining a welding with excellent characteristics in terms of strength, and at the same time efficiently dispersing the harmful gases.

Figure 6:
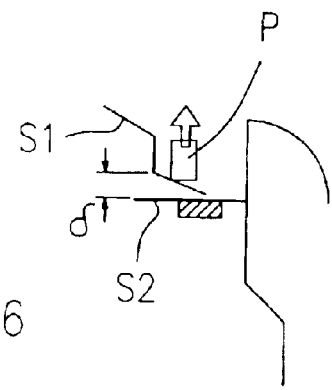

In a third step F3, illustrated in FIG. 6, the presser P is sligtly raised or retracted in a controlled mode, to enable the overlapped edges of the metal sheets S1, S2, thanks to their elastic recovery, to assume the aforesaid distance δ, whose optimum value, obtained from a series of welding tests, preferably is ranging from 5 to 20 hundredths of a millimeter.

Figure 7:
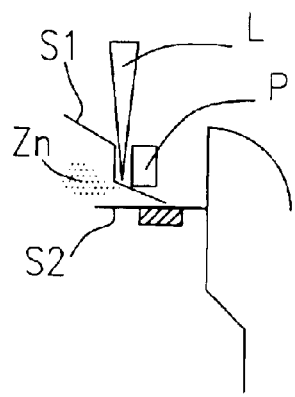

Lastly, in a fourth step F4, illustrated in FIG. 7, a laser beam L is directed against the edges of the metal sheets to weld them together; thanks to the distance δ, the harmful gases, in particular containing zinc Zn, which is given off by the metal sheets during the welding, do not remain in the area of the joining point, but can be dispersed.

In this way it is possible to prevent the gases from damaging the metal sheets, and consequently obtain a weld having aesthetical characteristics suitable for visible parts.

Nevertheless, a result of this kind can only be achieved whenever it is possible to control the movements of the presser P for disposing the edges of the metal sheets at the optimum distance δ, with precision and repeatability; this implies the need to compensate the clearances inside the clamping device to actuate the presser P.

A clamping device according to the invention therefore should be capable of controlling the movements of the presser P with precision and repeatability, automatically compensating its internal clearances, including those due to wear.

Figure 1:
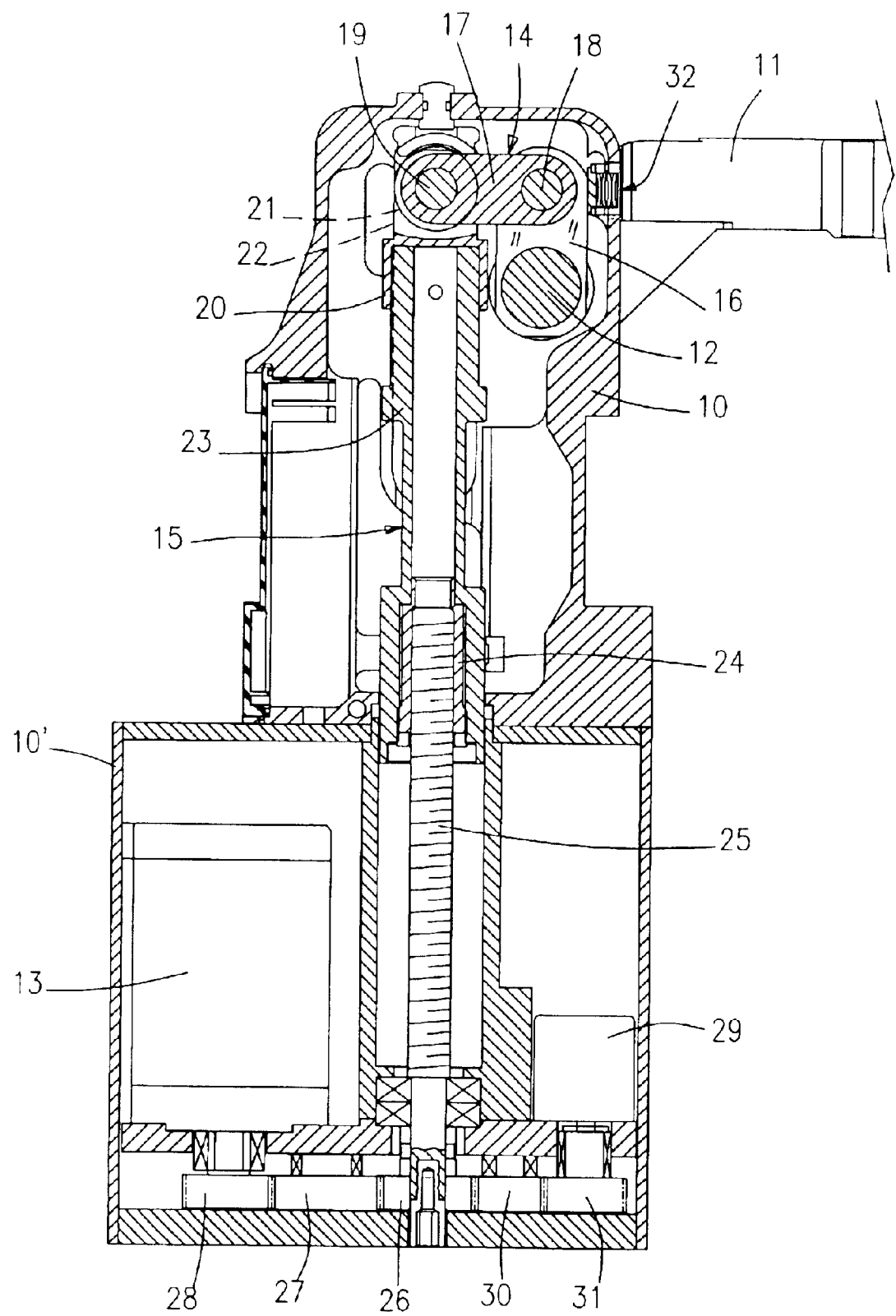
FIG. 1 shows a longitudinal cross-sectional view of the clamping device according to a first embodiment of the invention.
Figure 3:
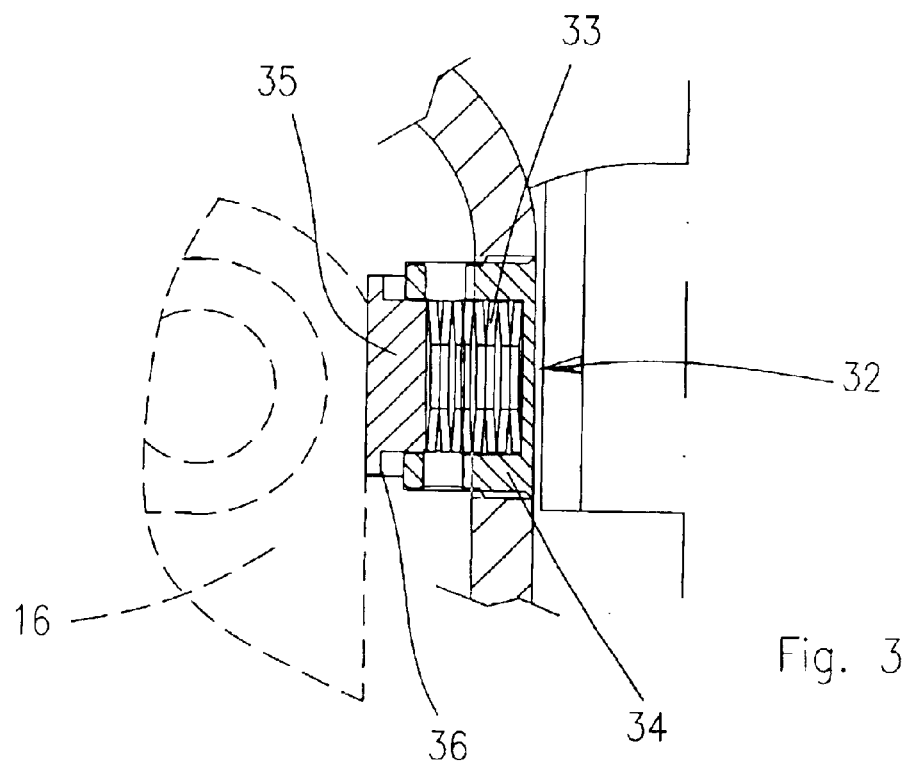
FIG. 3 shows an enlarged detail of FIG. 1.

In particular, in a first embodiment of the invention illustrated in FIGS. 1 and 3, the clamping device for clamping the overlapped edges of metal sheets to be joined by laser welding, comprises a box-shaped head 10 having a longitudinal axis, and a clamping arm 11 pivoted at 12 at one end and on a side of the box-shaped head 10.

The clamping arm 11, which supports a presser P, not shown in FIG. 1, can be rotated between a raised or open condition, a lowered or closed condition, and an intermediate condition.

The open condition of the arm 11 corresponds to the aforesaid first step F1, in which the presser P is in a raised or retracted condition to enable the metal sheets S1, S2 to be disposed in a welding position.

The closed condition of the arm 11 corresponds to the aforesaid second step F2, in which the presser P is urging the overlapped edges of the metal sheets S1, S2 elastically deforming them until they come into contact against a shoulder surface SF.

The intermediate condition of the arm 11 corresponds to the aforesaid third step F3, in which the presser P is raised or retracted in a controlled way to enable the edges of the metal sheets S1, S2 to dispose themselves, thanks to their elastic recovery, at a distance δ from each other of limited value, to enable the laser welding to be carried out during the subsequent step F4.

The clamping device also comprises an electric control actuator 13, preferably a step motor, disposed at the other end of the box-shaped head 10 with respect to the clamping arm 11, housed in a box-shaped casing 10' secured to the box-shaped head 10.

The clamping arm 11 is operatively connected to the electric actuator 13 by means of a toggle lever mechanism 14 and a sliding control member 15 movable in a longitudinal direction in the box-shaped head 10.

The toggle lever mechanism 14 in turn comprises at least one crank member 16, mechanically connected to the clamping arm 11 by means of the pivot 12.

The crank member 16 is in turn connected to an intermediate connecting rod 17, preferably of the rigid type, by means of a pin 18, said rod 17 in turn being connected, by means of a pin 19, to a fork member 20 fastened to the sliding control member 15 at the end facing the toggle lever mechanism 14.

The control member 15 can slide between a backward position and a forward position thanks to two guide rollers 21 rotatingly supported at both ends of the pin 19 to move along respective guide surfaces 22 on one side of the box-shaped head 10.

The sliding control member 15 is preferably of the telescopic type, comprising a tubular element 23 having the fork member 20 at the fore end, and a nut screw 24 at the rear end which engages onto a lead screw 25 rotatingly supported by the box-shaped casing 10'.

The lead screw 25 is provided with a gear wheel 26 which is operatively connected to a rotating shaft of the electric control motor 13 by means of a gear reduction unit comprising a first pair of gears 27 and 28.

The gear wheel 26 is also operatively connected to a control encoder 29 by a second pair of gears 30 and 31.

The connection between the clamping arm 11 and the electric control actuator 13 performed by the aforesaid mechanical members, implies the existence of internal clearances due to the mechanical couplings. The problem of the internal clearances is also worsened by the progressive wear that affects the various mechanical parts during the working life of the device.

To enable the compensation of the clearances existing in the operative connection between the clamping arm 11 and the electric control actuator 13, the clamping device according to the invention comprises counteracting biasing means 32 disposed downstream to the toggle lever mechanism 14, which are constructed and arranged to map the arm 11 to rearwardly rotate in the closed condition of the mechanism.

According to a first preferential embodiment, said biasing means may be in the form of a return spring 32 disposed downstream, on a side edge of the crank member 16, inside the box-shaped head 10; said biasing means are provided on the side of the aforesaid box-shaped head 10 which is opposite to the guide surfaces 22 for the guide rollers 21 of the control member 15.

In particular, the return spring 32 is disposed between the box-shaped head 10 and the crank member 16 of the toggle lever mechanism 14.

Said return spring 32 may be in the form of side by side arranged cup-shaped members or may be in the form of Belleville washers, helical springs, or pads of elastomeric material having a rigidity comparable to that of the aforesaid springs.

FIGS. 1 and 3 illustrate the case in which the springs 32 comprise a plurality of Bellville washers 33 housed inside a retaining cup 34 removably secured to the box-shaped head 10, for example by screwing.

A thrust member 35 slidingly extends from the retaining cup 34 towards the crank 16 of the toggle lever mechanism 14.

The thrust member 35 is preferably in the form of a piston member, comprising an annular shoulder 36 which comes into contact with the edge of the retaining cup 34.

The aforesaid return spring 32 make it possible to compensate the clearances inside the clamping device, in that it is compressed during the aforesaid second step F2 in which the presser P is urging on the overlapped edges of the metal sheets S1, S2, elastically deforming one or both of them until they come into contact with each other and against the shoulder SF.

In particular, during said step F2, the spring 32 is progressively compressed by the crank 16 until the electric actuator 13, once the edges of the metal sheets are in contact with each other, has tightened the device completely, stiffening it and totally eliminating the internal clearances.

Subsequently, during the aforesaid third step F3, in which the presser P must rise or retract in a controlled way to enable the edges of the metal sheets to dispose themselves at the optimal distance δ for the laser welding, the return spring 32 maintains the internal members for the operative connection between the clamping arm 11 and the electric actuator 13, under thrust.

In fact, when the electric motor 13 is actuated in the opening direction of the clamping arm 11, the return spring 32 exerts a sufficient thrust on the crank 16 to maintain the mechanical members inside the clamping device rigidly in contact each other, thereby compensating for any clearance in the device.

It will consequently be possible to set and maintain, in a controlled and precise way, the distance δ between the edges of the metal sheets S1, S2 to be welded, despite the extremely limited value of such distance δ.

Figure 2:
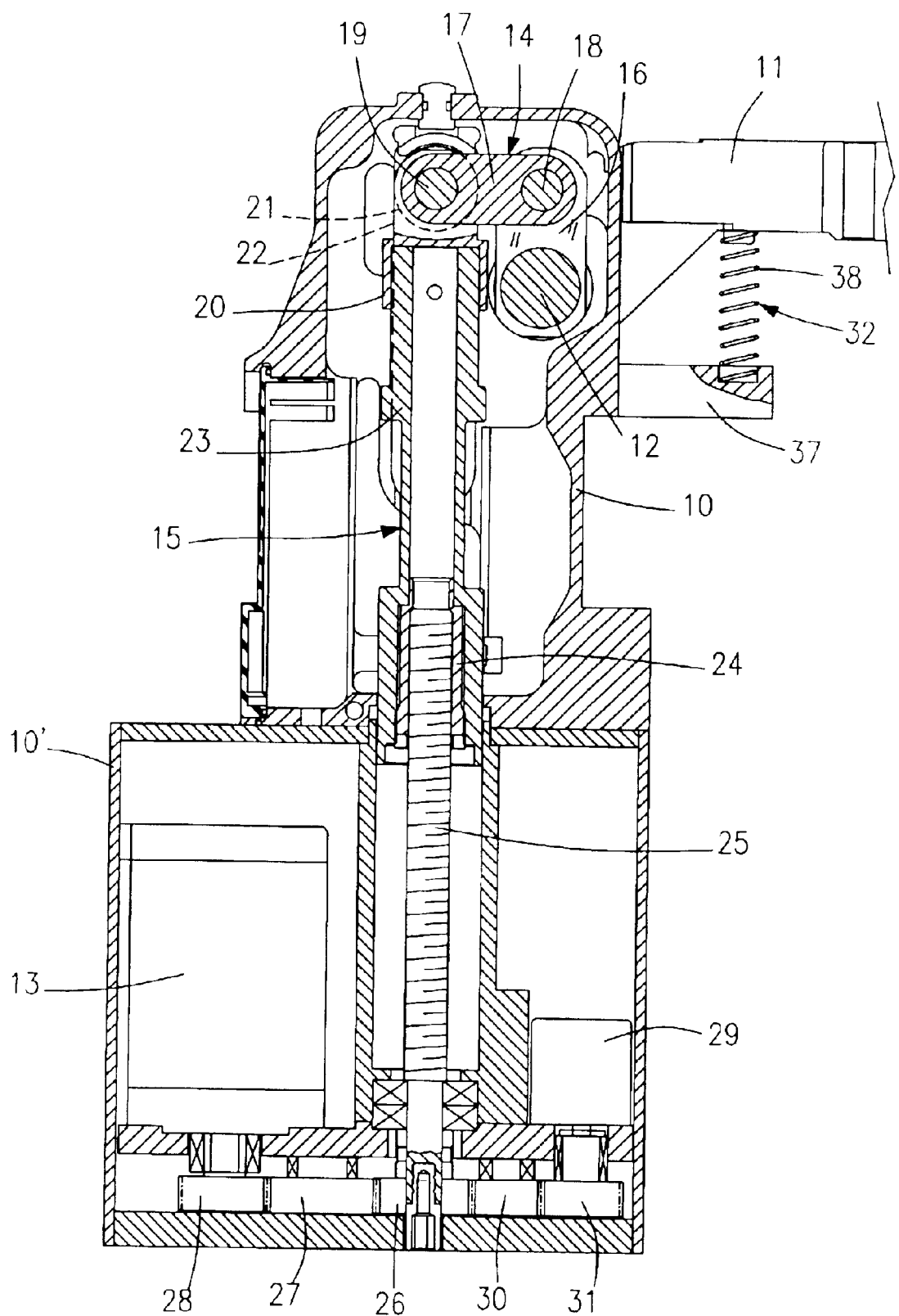
FIG. 2 shows a longitudinal cross-sectional view of the clamping device according to a further embodiment of the invention.

A further embodiment of the clamping device according to the invention is shown in FIG. 2, in which the same reference numbers have been used to indicate similar or equivalent parts.

In the example of FIG. 2, the biasing means 32 are disposed outside the box-shaped head 10, and in particular are disposed between the clamping arm 11 and a supporting element 37 secured, for example, to the box-shaped head 10, in such as way to be elastically deformed directly by the movement of the clamping arm 11 during the closing step.

In FIG. 2 the biasing means 32 are in the form of a helical spring 38. As mentioned previously, the counteracting biasing means 32 may, for example, also be in the form of an elastic pad or Belleville washers, having in this case a thrust member which, by acting on the Belleville washers, extends towards the clamping arm 11.

What has been described and shown with reference to the accompany drawings, has been given purely by way of example and in order to illustrate the general features of the invention, as well as some preferential embodiments; therefore, other modifications and variations to the clamping device are possible, without thereby deviating from the scope of the claims.

What is claimed is:

1. A clamping device for clamping the overlapped edges of metal sheets to be connected by laser welding, comprising:

a box-shaped head having a longitudinal axis;

a clamping arm pivotally connected to the head to rotate between an open condition, a closed condition in which the overlapped edges of the metal sheets (S1, S2) are pressed against each other, and an intermediate welding condition in which the overlapped edges of the metal sheets (S1, S2) are slightly spaced apart from each other to allow the laser welding;

an electric control actuator;

a toggle lever mechanism operatively connected between the clamping arm and the electric control actuator, said toggle lever mechanism being connected to the electric control actuator by intermediate transmission members; and counteracting biasing means for compensating clearances in the operative connection between the clamping arm and the electric control actuator;

said counteracting biasing means being constructed and disposed to rearwardly urge the clamping lever in the closed condition of the clamping mechanism.

2. A clamping device according to claim 1, wherein said counteracting biasing means are disposed inside the box-shaped head.

3. A clamping device according to claim 2, wherein said counteracting biasing means are disposed between the box-shaped head and a crank member of the toggle lever mechanism connected to the clamping arm.

4. A clamping device according to claim 1, wherein said counteracting biasing means are disposed outside the box-shaped head.

5. A clamping device according to claim 4, wherein said counteracting biasing means are disposed between the clamping arm and a supporting element secured to the box-shaped head.

6. A clamping device according to claim 1, wherein said counteracting biasing means comprise cup-shaped members.

7. A clamping device according to claim 1, wherein said counteracting biasing means comprise at least one helical spring.

8. A clamping device according to claim 1, wherein said counteracting biasing means comprise at least one elastic pad member.

9. A clamping device according to claim 1, wherein said counteracting biasing means comprise a plurality of cup-shaped members, in side a retaining cup secured to the box-shaped head, and a thrust member slidingly extending from the retaining cup.

10. A clamping device according to claim 9, wherein said retaining cup is removably secured to the box-shaped head.

11. A clamping device according to claim 9, wherein said thrust member is in the form of a sliding piston member, having an annular shoulder surface to stop against an edge of the retaining cup.

12. A clamping device according to claim 1, wherein said electric control actuator comprises at least one step motor.

* * * * *